United States Patent
Bex et al.

(10) Patent No.: US 9,616,853 B2
(45) Date of Patent: Apr. 11, 2017

(54) WIPING DEVICE, IN PARTICULAR WIPING DEVICE FOR A MOTOR VEHICLE PANE

(75) Inventors: Koen Bex, Jeuk/Limburg Belgien (BE); Helmut Depondt, Kessel-Lo (BE); Dirk Herinckx, Dries-Linter (BE)

(73) Assignee: Robert Bosch GmbH, Stuttgart (DE)

( * ) Notice: Subject to any disclaimer, the term of this patent is extended or adjusted under 35 U.S.C. 154(b) by 276 days.

(21) Appl. No.: 14/129,583

(22) PCT Filed: Jun. 1, 2012

(86) PCT No.: PCT/EP2012/060324
§ 371 (c)(1),
(2), (4) Date: Dec. 27, 2013

(87) PCT Pub. No.: WO2013/000656
PCT Pub. Date: Jan. 3, 2013

(65) Prior Publication Data
US 2014/0115812 A1    May 1, 2014

(30) Foreign Application Priority Data
Jun. 28, 2011  (DE) .................. 10 2011 078 186

(51) Int. Cl.
*B60S 1/38* (2006.01)
(52) U.S. Cl.
CPC ............. *B60S 1/3806* (2013.01); *B60S 1/381* (2013.01); *B60S 1/3881* (2013.01)
(58) Field of Classification Search
CPC ....... B60S 1/381; B60S 1/3806; B60S 1/3881
See application file for complete search history.

(56) References Cited

U.S. PATENT DOCUMENTS

| | | | |
|---|---|---|---|
| 7,370,385 B2 * | 5/2008 | Chiang | 15/250.43 |
| 7,540,061 B1 * | 6/2009 | Huang | 15/250.201 |
| 2003/0159229 A1 | 8/2003 | Weiler et al. | |
| 2006/0156529 A1 | 7/2006 | Wolfgang et al. | |
| 2007/0113367 A1 * | 5/2007 | Boland et al. | 15/250.201 |
| 2007/0174989 A1 | 8/2007 | Moll et al. | |
| 2009/0089956 A1 * | 4/2009 | De Block et al. | 15/250.201 |
| 2010/0218333 A1 * | 9/2010 | Ritt | 15/250.201 |

(Continued)

FOREIGN PATENT DOCUMENTS

| | | |
|---|---|---|
| CN | 1753801 | 3/2006 |
| CN | 101626925 | 1/2010 |

(Continued)

OTHER PUBLICATIONS

International Search Report for Application No. PCT/EP2012/060324 dated Jul. 16, 2012 (3 pages).

*Primary Examiner* — Gary Graham
(74) *Attorney, Agent, or Firm* — Michael Best & Friedrich LLP (57) ABSTRACT

The invention relates to a wiping device, in particular a wiping device for a motor vehicle pane, comprising a retaining unit (10a-10e) that has a retaining element (12a-12e) with a longitudinal guide channel (14a-14e) for guiding a spring element (16a-16e), and comprising a spoiler unit (22a-22e). According to the invention, the wiping device has at least one undercut (18a-18e, 20a-20e) that is provided in order to interlockingly connect the spoiler unit (22a-22e) to the retaining element (12a-12e) in a wiping direction (24a-24e).

5 Claims, 5 Drawing Sheets (56) References Cited

U.S. PATENT DOCUMENTS

2010/0299862 A1* 12/2010 Boland ............... B60S 1/38
                                                                     15/250.32
2011/0247167 A1* 10/2011 Huang ............... 15/250.32

FOREIGN PATENT DOCUMENTS

| CN | 101868384 | 10/2010 |
| DE | 20221548 | 6/2006 |
| DE | 102006020524 | 11/2007 |
| FR | 2851976 | 9/2004 |
| FR | 2923785 | 5/2009 |

* cited by examiner

WIPING DEVICE, IN PARTICULAR WIPING DEVICE FOR A MOTOR VEHICLE PANE

BACKGROUND OF THE INVENTION

A wiping device is already known, in particular a wiping device for a motor vehicle pane, comprising a retaining unit which has a retaining element with a longitudinal guide channel for guiding a spring element and comprising a spoiler unit.

SUMMARY OF THE INVENTION

The invention is based on a wiping device, in particular a wiping device for a motor vehicle pane, comprising a retaining unit which has a retaining element with a longitudinal guide channel for guiding a spring element and comprising a spoiler unit.

It is proposed that the wiping device has at least one undercut which is provided to connect the spoiler unit positively to the retaining element in a wiping direction, whereby a particularly secure coupling of the spoiler unit to the retaining element may be achieved. "Retaining unit" is intended to be understood here in this context, in particular, as a unit which is provided to connect the spoiler unit to a wiper strip. "Retaining element" is intended to be understood here in this context, in particular, as an element which is provided to connect a spoiler unit, a spring element and a wiper strip positively together. "Spring element" is intended to be understood in this context, in particular, as a spring elastic element which has at least one dimension which in a normal operating state is able to be resiliently altered by at least 10%, in particular by at least 20%, preferably by at least 30% and particularly advantageously by at least 50%, and which in particular produces a counter-force which is dependent on an alteration of the dimension and preferably proportional to the alteration, said counter-force counteracting the alteration. "Wiper strip" is intended to be understood in this context as, in particular, a strip which is provided to wipe a vehicle pane. Preferably, the wiper strip is formed from a rubber material. "Longitudinal guide channel" is intended to be understood in this context, in particular, as a guide channel which extends parallel to a longitudinal direction of the retaining unit. Preferably, the longitudinal guide channel comprises a free space as well as at least one channel wall defining the free space. "Longitudinal direction" is intended to be understood in this context, in particular, as a direction which extends substantially parallel to a longitudinal dimension of the retaining element. "Longitudinal dimension" is intended to be understood in this context, in particular, as the greatest possible dimension. "Substantially" is intended to be understood in this context, in particular, as a deviation of less than 10°, preferably less than 5°. A "dimension" of an element is intended to be understood in this context, in particular, as a maximum spacing between two points of a vertical projection of the element on a plane. "Undercut" is intended to be understood in this context, in particular, as a recess and/or depression which has a cross section tapering toward an opening. Preferably, the undercut has a C-shaped cross section. "Wiping direction" is intended to be understood in this context, in particular, as a direction which extends parallel to a surface to be wiped and/or perpendicular to a main orientation of the wiper strip. "Provided" is intended to be understood, in particular, as specifically designed and/or equipped.

In a further embodiment of the invention, it is proposed that the at least one undercut has a C-shaped contour, whereby forces between the spoiler unit and the retaining element may be transmitted over a particularly large surface area.

If the wiping device comprises two undercuts which are open in opposing directions, the operational reliability may be further increased.

It is further proposed that the at least one undercut is arranged inside the retaining element, whereby a particularly flat design of the wiping device may be achieved.

If the spoiler unit comprises two spoiler components of different hardness, advantageously the weight is able to be reduced and the strength increased.

It is also proposed that the spoiler component comprises the at least one undercut, whereby the wiping device is able to be configured to be particularly compact in a wiping direction.

If the spoiler unit comprises a longitudinal channel which has a triangular cross section, material and weight may be advantageously saved. "Triangular" is intended to be understood in this context as a contour which has three corners. The corners may also be rounded, depending on the application.

If the spoiler unit bears laterally against the retaining element, the wiping device may be protected in a particularly simple manner from the penetration of liquid.

BRIEF DESCRIPTION OF THE DRAWINGS

Further advantages are revealed from the following description of the drawings. Five exemplary embodiments of the invention are shown in the drawings. The drawings, the description and the claims contain numerous features in combination. The persons skilled in the art will also expediently consider the features individually and combine them to create further useful combinations.

In the drawings.

DETAILED DESCRIPTION

Figure 1:
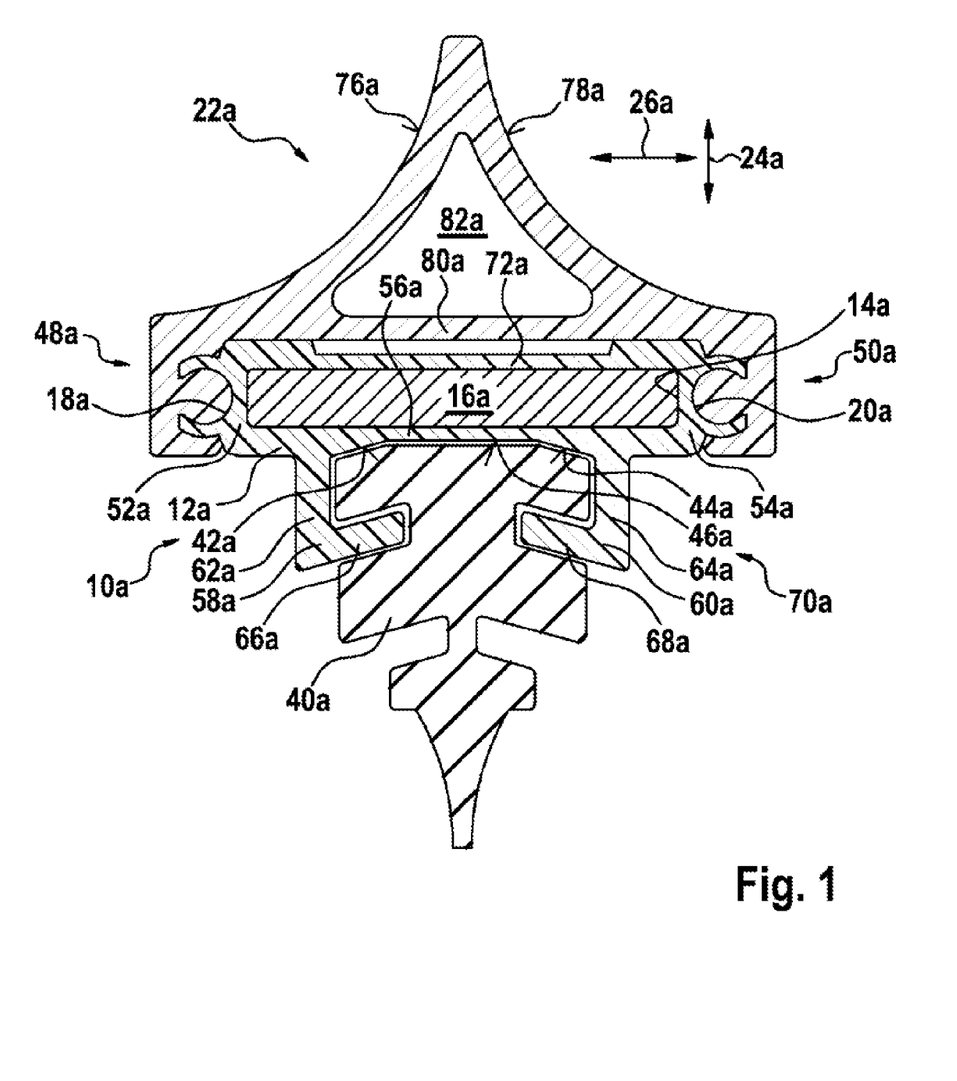
FIG. 1 shows a sectional view of a wiping device comprising a retaining unit.

FIG. 1 shows an exemplary embodiment of a wiping device according to the invention comprising a retaining unit 10a having a retaining element 12a which comprises a longitudinal guide channel 14a for guiding a spring element 16a, and comprising a spoiler unit 22a in a sectional view. The cutting plane extends perpendicular to a longitudinal direction of the retaining element 12a.

For guiding the spring element 16a, the retaining element 12a comprises lateral walls 52a, 54a which adjoin the longitudinal guide channel 14a. An intermediate wall 56a is also arranged on the lateral walls 52a, 54a, said intermediate wall terminating the longitudinal guide channel 14a in the direction of a wiper strip 40a. The lateral walls 52a, 54a extend from the intermediate wall 56a in a direction opposing the wiper strip 40a. A second intermediate wall 72a terminates the longitudinal guide channel 14a in the direction of the spoiler unit 22a. Thus the longitudinal guide channel 14a is entirely enclosed. An undercut 18a, 20a is arranged in the lateral walls 52a, 54a, in each case in a lateral region 48a, 50a, said undercut positively connecting the spoiler unit 22a to the retaining element 12a in a wiping direction 24a. The undercuts 18a, 20a have a C-shaped contour. Moreover, the undercuts 18a, 20a have a cross section tapering toward an opening. In this case, the two undercuts 18a, 20a are open in opposing directions.

A keder track 70a which comprises two guide profiles 58a, 60a is arranged on the intermediate wall 56a. The guide profiles 58a, 60a are configured integrally with the retaining element 12a. The guide profiles 58a, 60a in each case have a vertical wall 62a, 64a and in each case a horizontal wall 66a, 68a. The horizontal walls 66a, 68a respectively enclose with the vertical walls 62a, 64a an acute angle of 77°. The vertical walls 62a, 64a respectively enclose an angle of 90° relative to the intermediate wall 56a. The guide profiles 58a, 60a at their free ends of the horizontal walls 66a, 68a face in directions which face one another.

The intermediate wall 56a adjoins the longitudinal guide channel 14a of the retaining element 12a and comprises two surfaces 42a, 44a which in each case extend parallel to one of the horizontal walls 66a, 68a. The two surfaces 42a, 44a in each case adjoin a third surface 46a which is arranged between the surfaces 42a, 44a. The surfaces 42a, 44a in each case enclose an obtuse angle of 167° with the third surface 46a.

The spoiler unit 22a is produced in an extrusion process. The spoiler unit 22a has two spoiler sides 76a, 78a configured in an outwardly concave manner. A connecting web 80a which connects the concave spoiler sides 76a, 78a together is provided to reinforce the spoiler unit 22a. The connecting web 80a and the spoiler sides 76a, 78a enclose a longitudinal channel 82a which has a substantially triangular cross section.

The spoiler unit 22a is provided for shielding against driving wind. The spoiler unit 22a bears laterally against the retaining element 12a in the region of the longitudinal guide channel 14a in a positive manner. The spoiler unit 22a also bears in the region of the longitudinal guide channel 14a against one side of the retaining element 12a which faces the wiper strip 40a. The spoiler unit 22a thus bears positively in the region of the longitudinal guide channel 14a against the retaining element 12a and encompasses the longitudinal guide channel 14a. In this case, the spoiler unit 22a engages in the undercuts 18a, 20a and entirely fills said undercuts. Thus the retaining element 12a in the lateral regions 48a, 50a forms a positive connection with the spoiler unit 22a acting in the wiping direction 24a and in a vertical direction 26a.

The retaining element 12a is produced in one piece from polyethylene. In this connection, a person skilled in the art will consider different synthetic materials which appear expedient, such as for example polypropylene, polyamide, polyvinylchloride and/or polystyrene.

The spring element 16a is incorporated in the longitudinal guide channel 14a. The spring element 16a is produced from a spring steel and is provided to configure the retaining unit 10a to be elastically deflectable.

For assembly, the spring element 16a is initially inserted into the longitudinal guide channel 14a. Subsequently, the wiper strip 40a is pushed into the keder track 70a and forms a positive connection with the retaining element 12a. The spoiler unit 22a is now pushed over the retaining element 12a and is then positively connected thereto.

In FIGS. 2 to 5 four further exemplary embodiments of the invention are shown. The following descriptions are substantially limited to the differences between the exemplary embodiments, wherein reference may be made to the description of the first exemplary embodiment relative to components, features and functions which remain the same. To differentiate between the exemplary embodiments, the letter a in the reference numerals of the exemplary embodiment in FIG. 1 is replaced by the letters b to e in the reference numerals of the exemplary embodiments of FIGS. 2 to 5. Relative to components which are identified as the same, in particular relative to components with the same reference numerals, in principle reference may also be made to the drawings and/or the description of the first exemplary embodiment.

Figure 2:
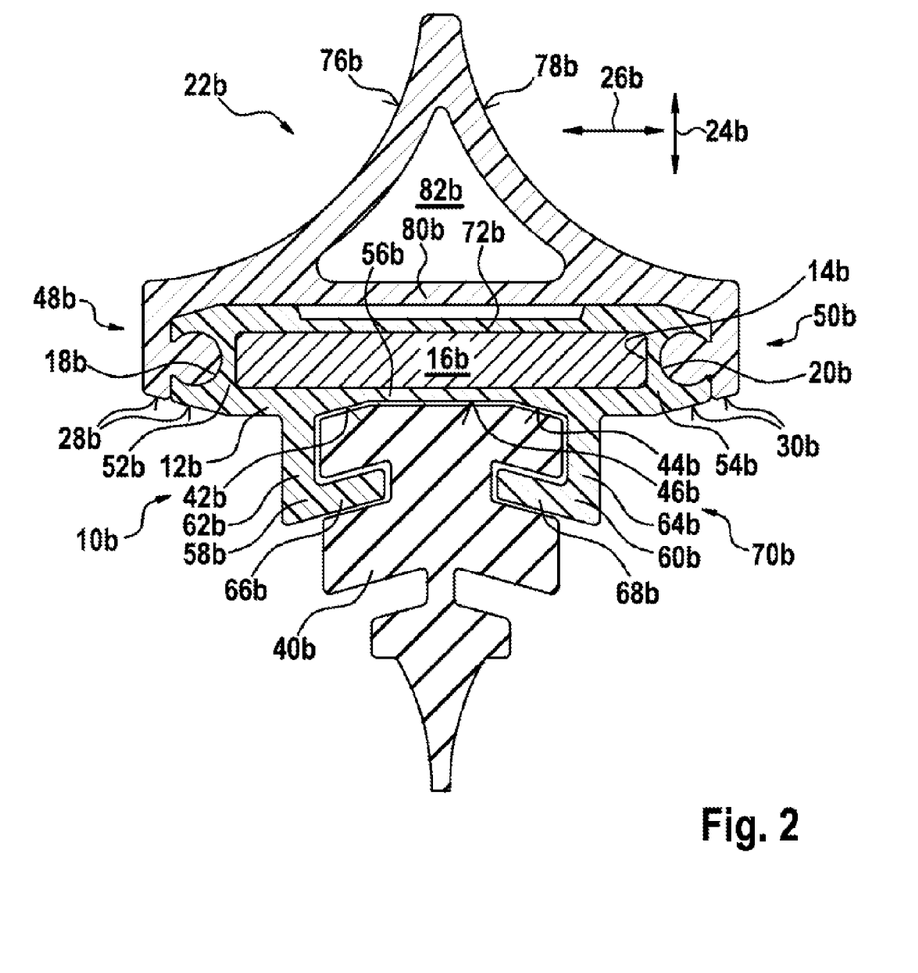
FIG. 2 shows a sectional view of a further exemplary embodiment of a wiping device comprising a retaining unit.

FIG. 2 shows a further exemplary embodiment of a wiping device according to the invention comprising a retaining unit 10b having a retaining element 12b which has a longitudinal guide channel 14b for guiding a spring element 16b, as well as a spoiler unit 22b in a sectional view. The sectional plane extends perpendicular to a longitudinal direction of the retaining element 12b. The wiping device corresponds substantially to the exemplary embodiment shown in FIG. 1.

In one respective lateral region 48b, 50b, the retaining element 12b and the spoiler unit 22b have a surface 28b, 30b which extends parallel to a horizontal wall 66b, 68b of a keder track 70b of the retaining element 12b. The surface 28b, 30b respectively encloses an angle of 13° with a wiping direction 24b.

Figure 3:
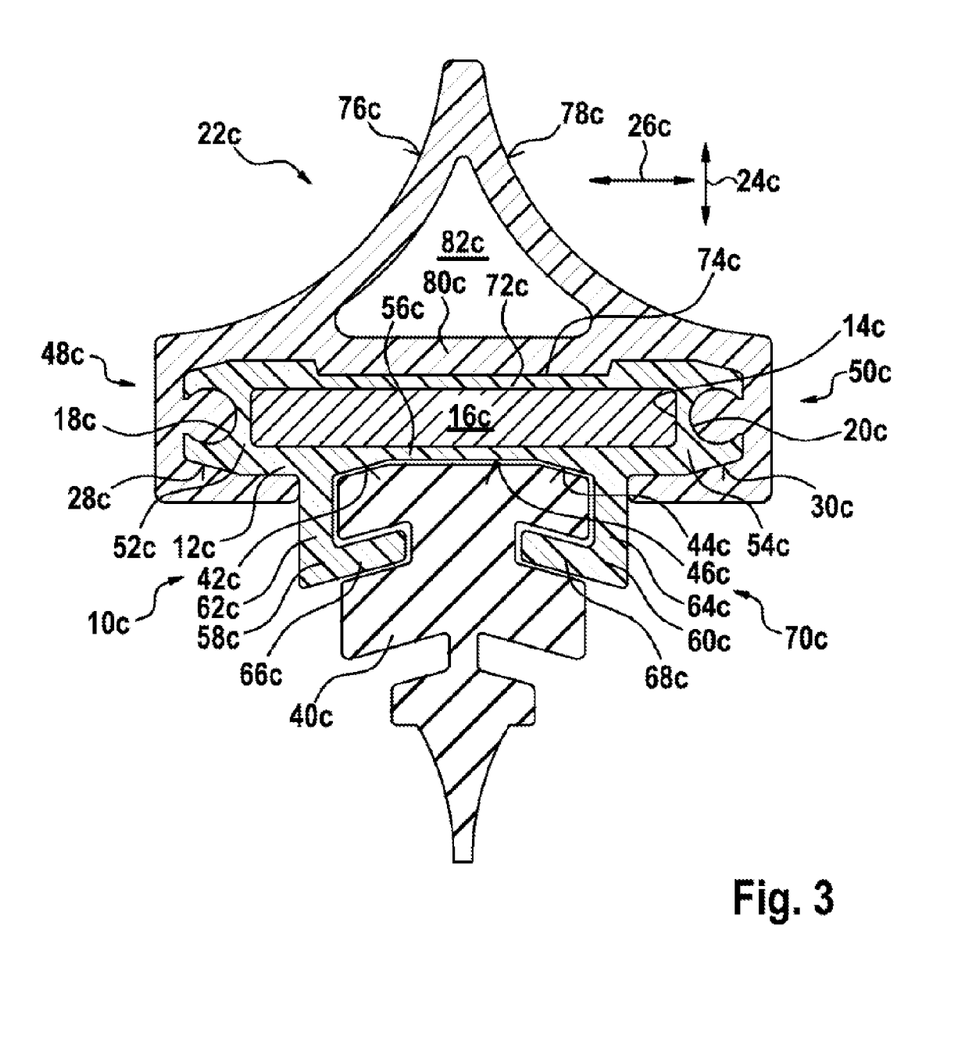
FIG. 3 shows a sectional view of a further exemplary embodiment of a wiping device comprising a retaining unit.

FIG. 3 shows a further exemplary embodiment of a wiping device according to the invention, comprising a retaining unit 10c having a retaining element 12c, which has a longitudinal guide channel 14c for guiding a spring element 16c, as well as a spoiler unit 22c in a sectional view. The cutting plane extends perpendicular to a longitudinal direction of the retaining element 12c. The wiping device corresponds substantially to the exemplary embodiment shown in FIG. 2.

In one respective lateral region 48c, 50c, the retaining element 12c has a surface 28c, 30c which extends parallel to a horizontal wall 66c, 68c of a keder track 70c of the retaining element 12c. The surface 28c, 30c respectively encloses an angle of 13° with a wiping direction 24c.

The spoiler unit 22c in the region of the longitudinal guide channel 14c bears against one side of the retaining element 12c which faces a wiper strip 40c. In this case, the spoiler unit 22c also positively bears against the surfaces 28c, 30c of the retaining element 12c. The spoiler unit 22c also bears against vertical walls 62c, 64c of the keder track 70c. A connecting web 80c is partially incorporated in a recess 74c of a second intermediate wall 72c and thus forms with the second intermediate wall 72c a positive connection acting in a wiping direction 24c.

Figure 4:
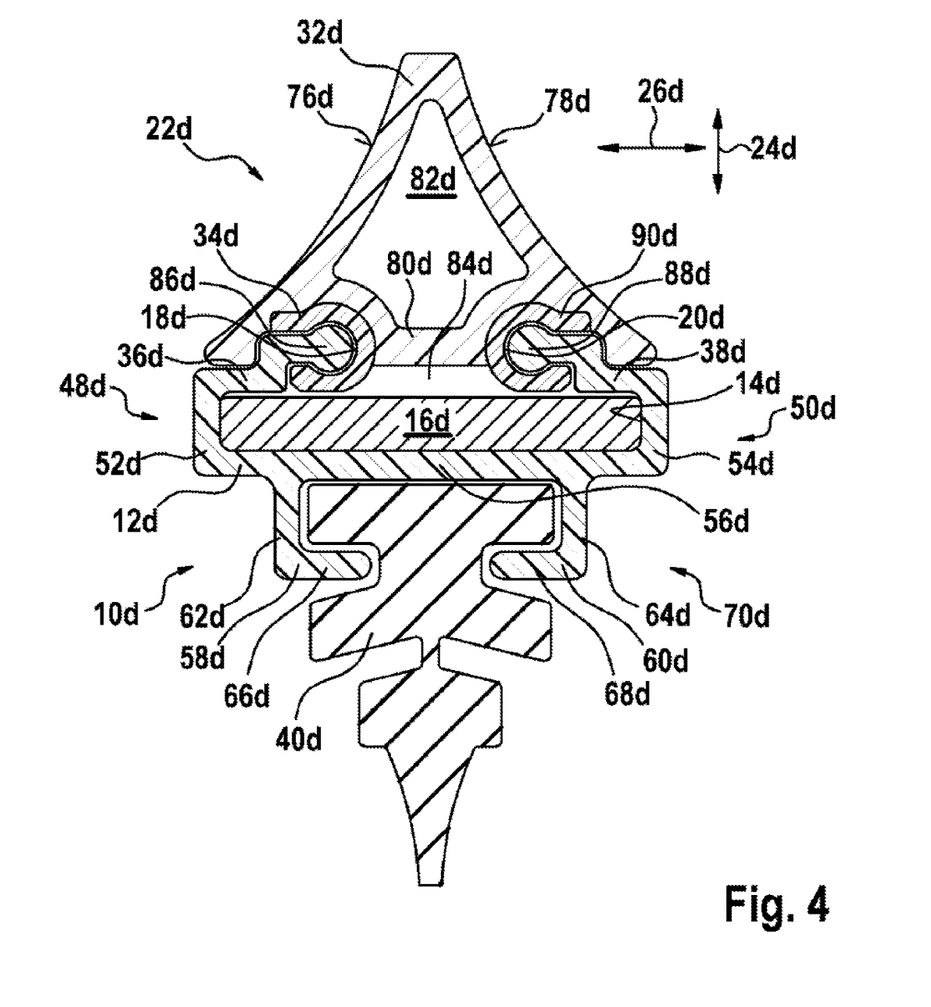
FIG. 4 shows a sectional view of a further exemplary embodiment of a wiping device comprising a retaining unit and FIG. 5 shows a sectional view of a further exemplary embodiment of a wiping device comprising a retaining unit

FIG. 4 shows a further exemplary embodiment of a wiping device according to the invention, comprising a retaining unit 10d having a retaining element 12d which has a longitudinal guide channel 14d for guiding a spring element 16d, in a sectional view. The cutting plane extends perpendicular to a longitudinal direction of the retaining element 12d.

The retaining element 12d has two fastening elements 86d, 88d. The fastening elements 86d, 88d are integrally formed with the retaining element 12d. The fastening elements 86d, 88d at their free ends face in directions facing one another. Moreover, the fastening elements 86d, 88d form two channel walls 36d, 38d which adjoin the longitudinal guide channel 14d on a side remote from the wiper strip. The fastening elements 86d, 88d are configured in the region of their free ends in the form of a keder track. The ends are encompassed by a spoiler unit 22d. To this end, the spoiler unit 22d has two undercuts 18d, 20d into which the fastening elements 86d, 88d engage. The undercuts 18d, 20d have in each case a C-shaped contour and are open in opposing directions. The undercuts 18d, 20d thus connect the spoiler unit 22d positively to the retaining element 12d in a wiping direction 24d.

To guide the spring element 16d, lateral walls 52d, 54d of the longitudinal guide channel 14d adjoin the channel walls 36d, 38d. The channel walls 36d, 38d in this case enclose a right angle with the lateral walls 52d, 54d. Moreover, an intermediate wall 56d is arranged on the lateral walls 52d, 54d, said intermediate wall terminating the longitudinal guide channel 14d in the direction of a wiper strip 40d. The lateral walls 52d, 54d extend from the intermediate wall 56d in a direction opposing the wiper strip 40d. The retaining element 12d has a longitudinal opening 84d which opens the longitudinal guide channel 14d toward the spoiler unit 22d.

Two L-shaped guide profiles 58d, 60d of the retaining unit 10d are arranged on the intermediate wall 56d. The guide profiles 58d, 60d are integrally formed with the retaining element 12d. The guide profiles 58d, 60d have in each case a vertical wall 62d, 64d and in each case a horizontal wall 66d, 68d. The horizontal walls 66d, 68d respectively enclose an angle of 90° with the vertical walls 62d, 64d. In this case, the horizontal walls 66d, 68d face one another. The vertical walls 62d, 64d respectively enclose an angle of 90° relative to the intermediate wall 56d. The guide profiles 58d, 60d at their free ends of the horizontal walls 66d, 68d face in directions facing one another. The guide profiles 58d, 60d and the intermediate wall 56d form the keder track 70d into which the wiper strip 40d is inserted.

The retaining element 12d is produced in one piece from polyethylene in an extrusion process. In this connection, a person skilled in the art will consider different synthetic materials which may be expedient, such as in particular polypropylene, polyamide, polyvinylchloride and/or polystyrene.

The spoiler unit 22d is produced in a co-extrusion process from two spoiler components 32d, 34d, 90d of different hardness. The first spoiler component 32d has two spoiler sides 76d, 78d configured in an outwardly concave manner. The more flexible spoiler component 32d and the harder spoiler components 34d, 90d are connected together by a material connection and in a planar manner. To reinforce the spoiler unit 22d, the first spoiler component 32d has a connecting web 80d which connects together the concave spoiler sides 76d, 78d. The more flexible spoiler component 32d encloses a longitudinal channel 82d which has a five-sided cross section. The harder spoiler components 34d, 90d in each case comprise one of the undercuts 18d, 20d.

The first spoiler component 32d is integrally formed with the spoiler components 34d, 90d and is provided for deflecting driving wind. The spoiler components 34d, 90d have a greater strength and hardness than the first spoiler component 32d. The spoiler components 34d, 90d are configured separately from one another. The spoiler component 34d forms the fastening elements 86d, 88d. The fastening elements 86d, 88d are of circular shape and bear positively against the spoiler components 34d, 90d.

The spring element 16d is produced from a spring steel and provided to configure the retaining unit 10d to be elastically deflectable. For assembly, the spring element 16d is initially inserted into the longitudinal guide channel 14d. Subsequently, the wiper strip 40d is pushed into the keder track 70d and forms a positive connection with the retaining element 12d. The spoiler unit 22d is now pushed over the fastening elements 86d, 88d and is then positively connected thereto.

Figure 5:
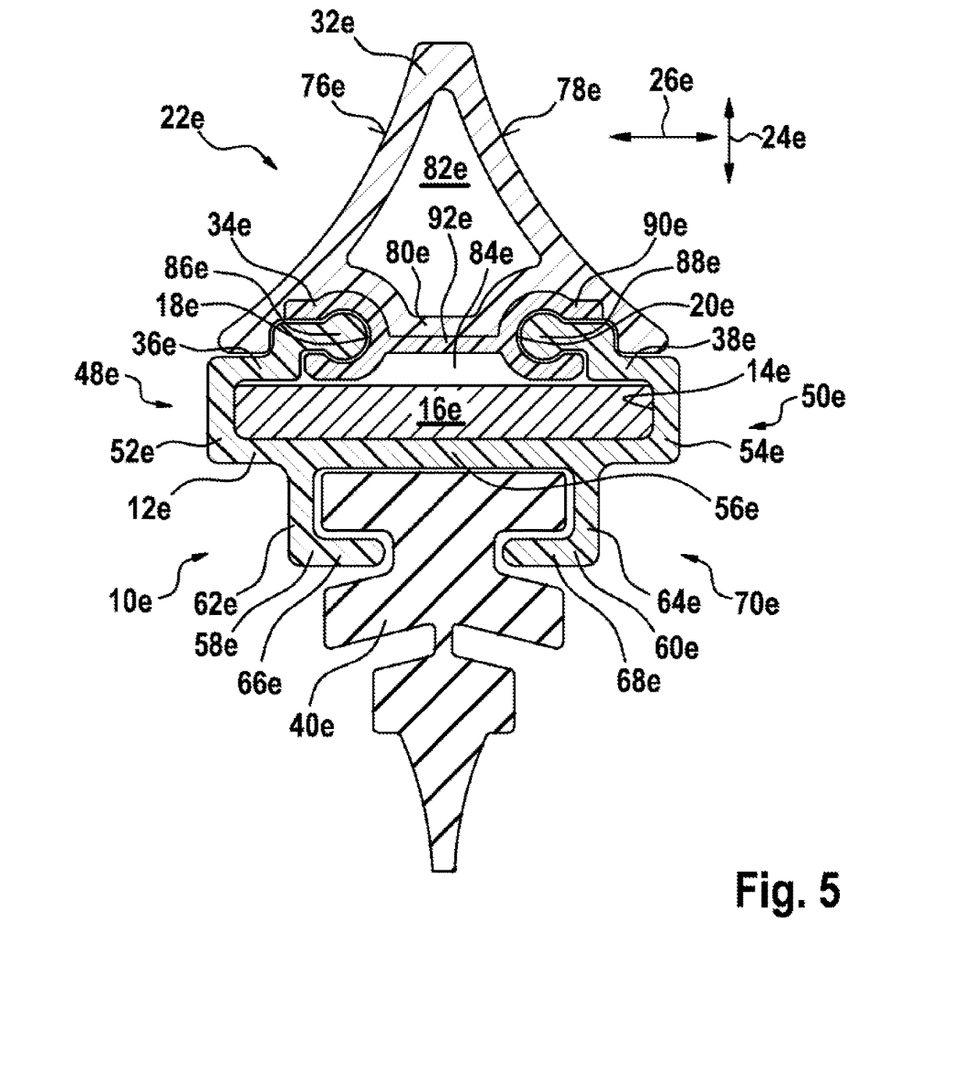

FIG. 5 shows a further exemplary embodiment of a wiping device according to the invention, comprising a retaining unit 10e having a retaining element 12e which has a longitudinal guide channel 14e for guiding a spring element 16e in a sectional view. The cutting plane extends perpendicular to a longitudinal direction of the retaining element 12e. The wiping device shown corresponds substantially to the exemplary embodiment shown in FIG. 4.

The retaining element 12e has two fastening elements 86e, 88e. The fastening elements 86e, 88e are integrally formed with the retaining element 12e. The fastening elements 86e, 88e at their free ends face in directions facing one another. Moreover, the fastening elements 86e, 88e form two channel walls 36e, 38e which adjoin the longitudinal guide channel 14e on a side remote from the wiper strip. The fastening elements 86e, 88e are configured in the form of a keder track in the region of their free ends. The ends are encompassed by a spoiler unit 22e. To this end, the spoiler unit 22e has two undercuts 18e, 20e in which the fastening elements 86e, 88e engage. The undercuts 18e, 20e have in each case a C-shaped contour and are open in opposing directions. The undercuts 18e, 20e thus connect the spoiler unit 22e positively to the retaining element 12e in a wiping direction 24e.

The spoiler unit 22e has two fastening elements 86e, 88e. In each case, the fastening elements 86e, 88e form a C-shaped receiving region and thus a keder track 70e. The fastening elements 86e, 88e are connected together via a stabilizing web 92e. The stabilizing web 92e consists of the same material as the fastening elements 86e, 88e and is integrally formed therewith. Moreover, the fastening elements 86e, 88e are formed integrally with a connecting web 80e, wherein the connecting web 80e connects together two spoiler sides 76e, 78e of the spoiler unit 22e.

What is claimed is:

1. A wiping device, comprising a retaining unit (10a-10e) which has a retaining element (12a-12e) with a longitudinal guide channel (14a-14e) for guiding a spring element (16a-16e), the wiping device further including a spoiler unit (22a-22e), wherein the retaining unit (12a-12e) includes an undercut (18a-18e, 20a-20e) which is provided to connect the spoiler unit (22a-22e) positively to the retaining element (12a-12e) in a wiping direction (26a-26e), wherein the undercut (18a-18e, 20a-20e) has a C-shaped contour defined by two arms that form an opening in the retaining element (12a-12e) along the wiping direction (26a-26e), wherein the opening receives the spoiler unit (22a-22e), wherein the retaining element (12a-12e) further includes a track (70a-70e) for guiding a wiper strip (40a-40e), the track (70a-70e) including a wall (66a-66e) with a surface that extends at an oblique angle relative to a plane that is perpendicular to a plane of symmetry of the wiping device, and wherein the surface of the wall also extends parallel to a further surface (30a-30e) along a bottom of one of the two arms.

2. The wiping device as claimed in claim 1, characterized in that the surface of the wall (66a-66e) of the retaining element (12a-12e) also extends parallel to a bottom surface of the spoiler unit (22a-22e).

3. The wiping device as claimed in claim 1, characterized in that the spoiler unit (22a-22c) bears laterally against the retaining element (12a-12c).

4. The wiping device as claimed in claim 1, further comprising a wiper strip interlocking with the retaining element.

5. The wiping device as claimed in claim 4, wherein the wiper strip is located on a side of the retaining element opposite the spoiler unit.

* * * * *